United States Patent [19]

García et al.

[11] Patent Number: 4,615,355
[45] Date of Patent: Oct. 7, 1986

[54] AUTOMOBILE ANTI-THEFT DEVICE

[76] Inventors: Gervasio B. García; Eduardo E. Valdesuso; Nicolas G. B. Quintero, all of GPO Box 1201, San Juan, P.R. 00936

[21] Appl. No.: 535,822

[22] Filed: Sep. 26, 1983

[51] Int. Cl.[4] ............................................. F16K 35/00
[52] U.S. Cl. ....................................... 137/383; 70/245; 70/247
[58] Field of Search .................. 70/245, 247; 137/383

[56] References Cited

U.S. PATENT DOCUMENTS

| 1,262,200 | 4/1918 | Jensen | 70/245 |
| 1,613,698 | 1/1927 | Flint et al. | 70/245 |
| 1,692,688 | 11/1928 | Lach | 70/245 |
| 3,687,215 | 8/1972 | Andres et al. | 137/383 |
| 3,718,202 | 2/1973 | Brock | 70/245 |
| 3,995,462 | 12/1976 | Boyle | 70/247 |
| 4,231,241 | 11/1980 | Lipski | 70/245 |

FOREIGN PATENT DOCUMENTS 1355328 6/1974 United Kingdom .................. 70/245

Primary Examiner—A. Michael Chambers
Attorney, Agent, or Firm—Eric P. Schellin

[57] ABSTRACT

A device for locking the automatic transmission of an automobile is described to deter theft. The device locks either the outer manual lever, the detent lever or the manual valve. Once locked a spring keeps the transmission locked unless unlocked. The unlocking mechanism can be mechanical, electromagnetic or vacuum. The lines which control the unlocking are armoured to prevent tampering. Severing of these lines keeps the vehicle locked and immovable even if the motor is started.

4 Claims, 10 Drawing Figures

AUTOMOBILE ANTI-THEFT DEVICE

FIELD OF THE INVENTION

This invention pertains to devices which lock the transmission of an automobile in the parking position to prevent theft.

BACKGROUND OF THE INVENTION

The large number of automobile thefts are evidence that locks on doors and the ignition systems are not sufficient to prevent car theft. A further locking system is needed which can be armoured to prevent being "hot-wired" and which prevents the vehicle from being moved even if the motor is "hot-wired". A wide variety of theft prevention devices and systems have been developed for use with automobiles and similar type vehicles. Such devices fall generally into two separate categories: those which are designed to provide a signal, such as a siren or flashing lights, if the vehicle is being broken into; and those which are designed to prevent the engine from being started, even though the ignition switch might be bypassed. More elaborate versions of the first category may even be arranged to transmit an alarm signal to activate a remote paging device carried on the person of the owner, for example.

It is generally a relatively simple matter for a professional car thief to bypass such devices. It may take as little as fifteen seconds for such a thief to bypass an ignition system lock after entry into the automobile and such thieves usually find it a simple matter to gain entry. Many cars can be unlocked simply by expert manipulation of a coat hanger or similar implement. In such an instance, the devices of the type which provide a warning of some kind to the owner merely serve to indicate that the car is being driven away. Those devices designed to prevent the engine from being started can usually be bypassed rather readily by a professional thief, simply by the process of "hot-wiring" the ignition. The steering column lock often associated with the ignition switch can be pulled out very easily by tools which are designed for the purpose.

Vehicle protection systems of the type described can be very expensive. Prices generally start at approximately $35.00 and can run upwards of several hundreds of dollars, depending on the sophistication and complexity of the system. Moreover, installation of such systems usually requires the services of a professional installer, further increasing the cost of the owner.

A large variety of anti-theft devices for automobiles has been patented. For example, U.S. Pat. No. 4,116,297 shows a device which locks the driver's seat folded over the steering wheel. U.S. Pat. No. 4,103,524 shows a steering wheel lock. U.S. Pat. No. 3,463,263 shows a parking brake lock. U.S. Pat. No. 4,205,325 shows a keyless entry system. U.S. Pat. No. 4,231,241 shows a specialized automatic transmission lock.

SUMMARY OF THE INVENTION

The aim of this invention is to describe a system of locking a variety of automatic transmissions. A further goal is to describe a transmission locking system which stays locked if partially destroyed by tampering.

Locking the automatic transmission with an armoured system is less susceptible to defeat that locking switches in the ignition system. Further the automatic transmission is less accessible than the locks on the doors of cars.

As the gear shift lever is moved by the operator of the vehicle a series of linkages transmits this motion to an outer manual lever on the automatic transmission. One end of the outer manual level is attached to the manual shaft which penetrates the transmission casing. On the inside of the transmission, the manual shaft is connected to the detent lever. Thus moving the gear shift lever transmits motion to the detent lever inside the transmission. The detent lever in turn is connected to the manual valve so that moving the gear shift lever moves the manual valve.

In this invention a bolt is urged by a spring into a blocking open end in the outer manual lever, a blocking open end in the detent lever or against the end of the manual valve when the shift selector lever is in the parking position. An unlatching system is necessary to withdraw the bolt. A locking system inside the car such as a second key system, an electronic keyless system such as in U.S. Pat. No. 4,205,325 or other code system can be used to control the latching. Even a second key system is an advantage because the anti-theft system can be turned to unlock and the key removed when the car is in the custody of mechanics and parking attendants to prevent copying the second key. A mechanical linkage, an electromechanical linkage or a vacuum linkage can be provided between the locking system and the unlatching subsystems. The lines which communicate these signals from the lock must be armoured and the unlatching system covered by a heavy plate to prevent tampering. If the lines are cut the spring urges the bolt into the latched position preventing movement.

These and further constructional and operational characteristics of the invention will be evident from the detailed description given hereinafter with reference to the figures of the accompanying drawings which illustrate preferred embodiments and alternatives by way of non-limiting examples.

DESCRIPTION OF THE PREFERRED EMBODIMENT

Figure 1:
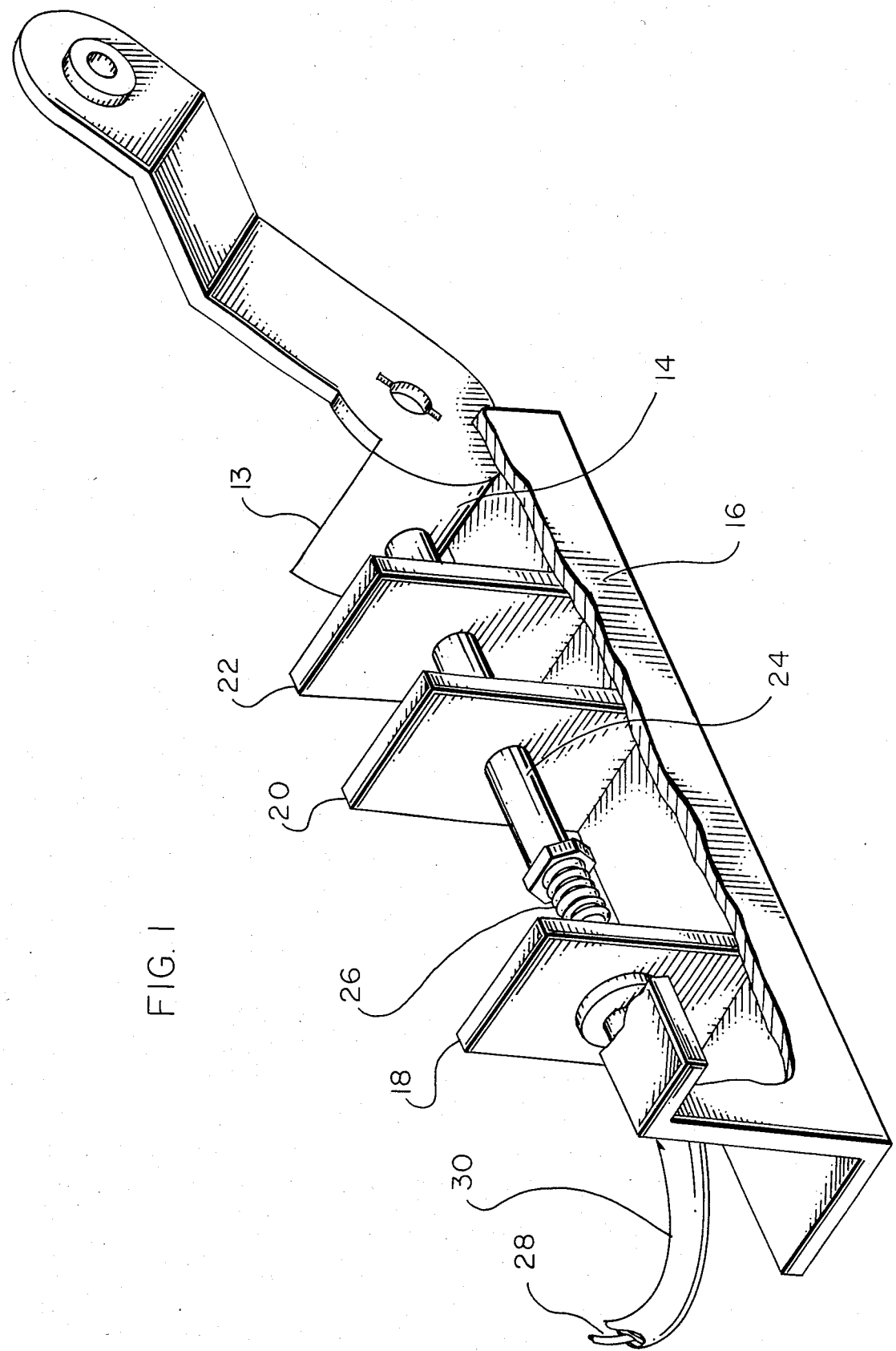
FIG. 1 shows the embodiment with the outer manual lever in the unlatched position.

Referring now to the drawings wherein reference numerals are used to designate parts throughout the various figures thereof, there is shown in FIG. 1 the outer manual lever 10 on the side of an automatic transmission. The original outer manual lever has been removed and modified to feature the blocking open end 13. In general, in order to add the blocking open end 13 it is necessary to attach a new steel plate 14 to the original outer manual lever and position the blocking open end 13 in the steel plate 14. The locking mechanism is made of the base 16, and supports 18, 20, 22 attached to the base with coaxial holes in the supports. In the embodiment shown, there is a bolt 24, a spring 26 urging the bolt toward the outer manual lever 10 and a steel cable 28 in an armoured sheath 30 to protect the cable. When the blocking open end is aligned with the bolt 24, the spring 26 urges the bolt 24 past blocking open end. In the position of the outer manual lever shown in FIG. 1, the transmission is not in the parking gear.

Figure 2:
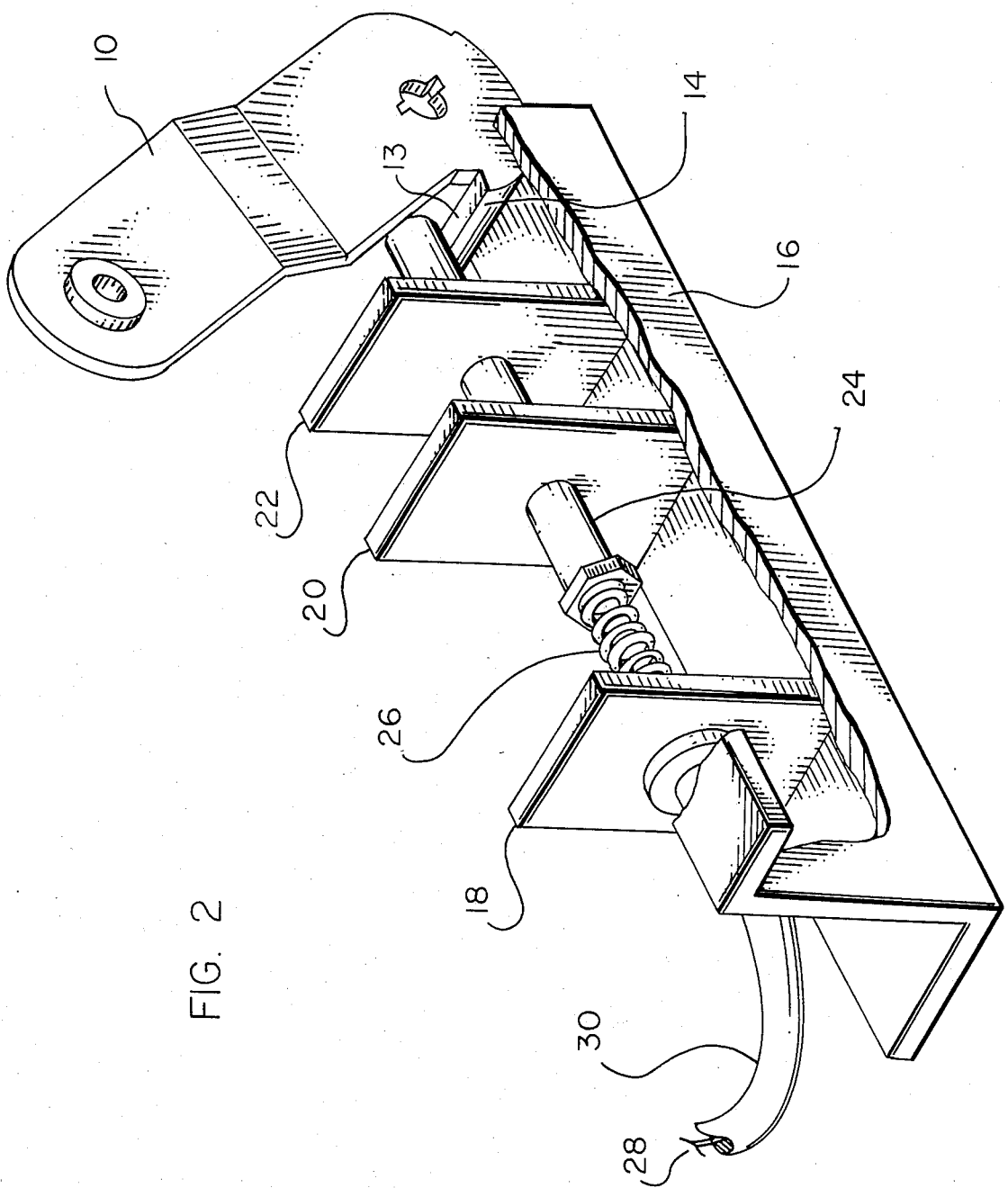
FIG. 2 shows the embodiment with the outer manual lever in the latched position.

In FIG. 2 the transmission has been shifted into parking gear, the bolt 24 now is aligned with the blocking open end and the bolt 24 is urged past the blocking open end 13 by the spring 26 locking the transmission in park. The mechanism is unlocked by drawing the bolt 24 out using the steel cable 28.

The locking mechanism base 16 can be ⅛ steel with the supports 18, 20 and 22 welded or screwed to the base 16. The base is welded or bolted to the automatic transmission in a manner which make it secure and difficult to remove from beneath the car.

In other embodiments the mechanical cable system can be replaced with an electromechanical unlatching means or a vacuum unlatching means. Whichever unlatching means is used the steel cable, electric wires or vacuum control line must be armoured to prevent tampering with the system. The electromechanical and vacuum embodiments must retain the spring 26. If the wires, the vacuum line or cable are cut the spring 26 will retain the bolt 24 in the locked position.

Figure 3:
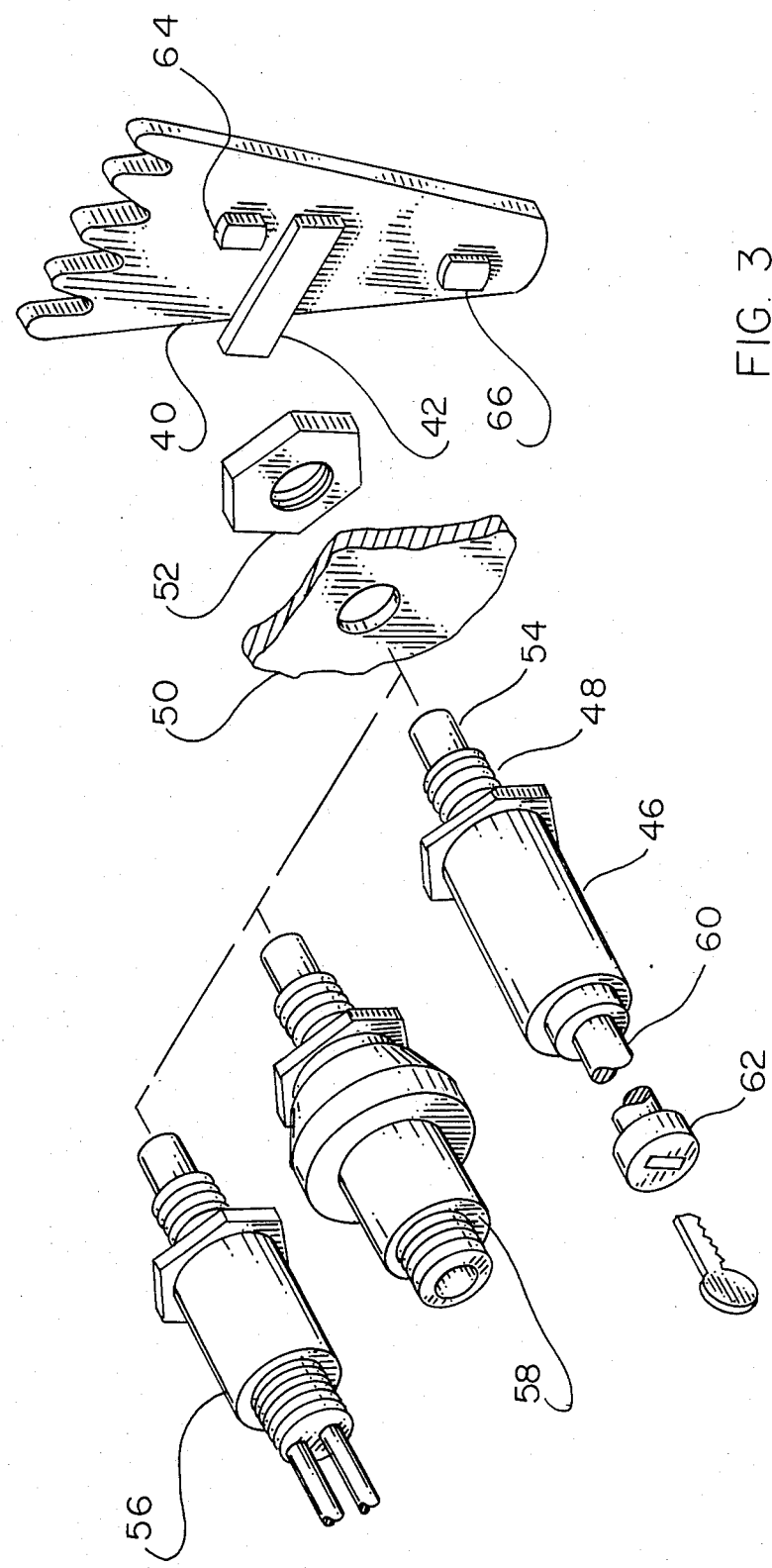
FIG. 3 shows the embodiment with the detent lever in an exploded view with some parts rotated.
Figure 4:
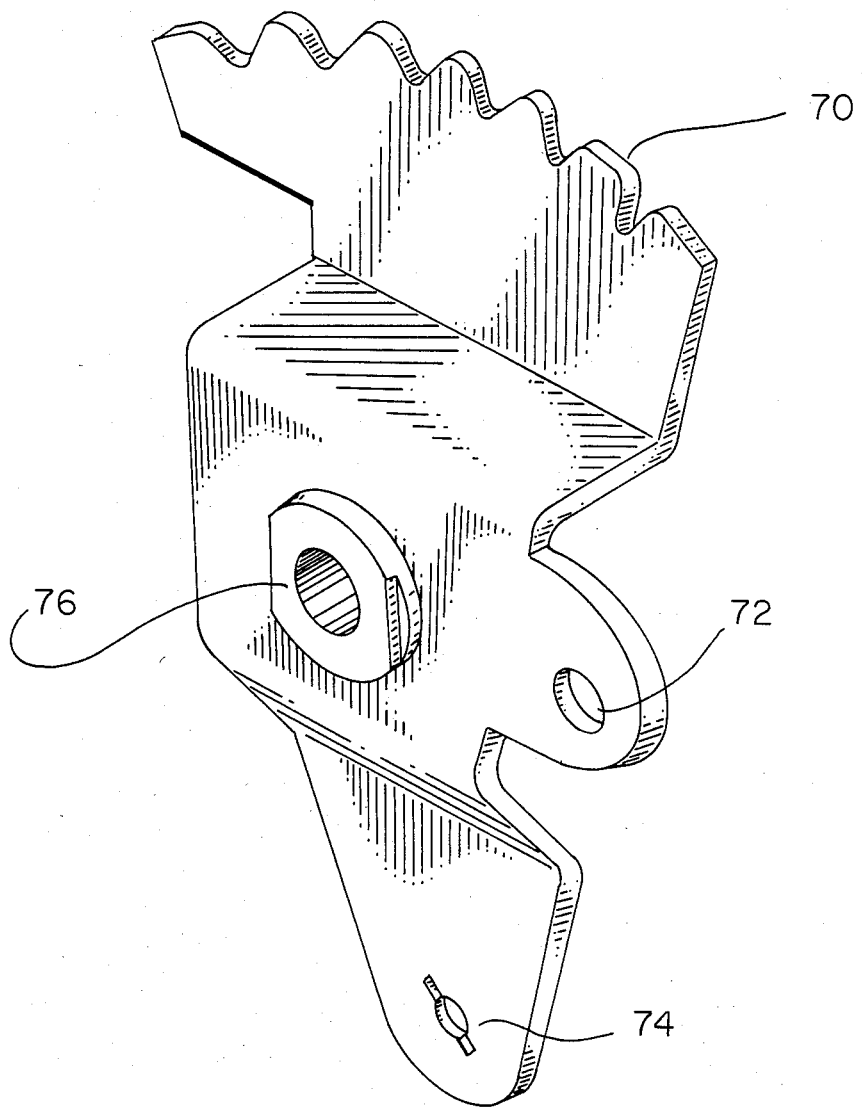
FIG. 4 shows another embodiment of a modified detent lever.

A further embodiment is shown in FIG. 3. In this embodiment the detent lever 40 inside the transmission is shown in an exploded view with some parts rotated. The detent lever 40 is modified by attaching the plate 42 with the perforation 44. The unlatching mechanism 46 has a threaded barrel 48 which penetrates the casing 50 and is fastened with the nut 52 from the inside. The bolt 54 is aligned with the perforation 44 when the transmission is in the parking gear. A spring inside the mechanical unlatching mechanism 46 urges the bolt 54 into the perforation 44. The linkage 60 from the key subsystem 62 must be armoured, as in previous embodiments to prevent tampering. The mechanical unlatching mechanism 46 can be replaced with an electromechanical unlatching mechanism 56 or a vacuum unlatching mechanism 58 in other embodiments. The configuration of the detent lever 40 varies considerably from model to model. The hole for the manual lever is shown at 64 and the hole for the parking rod at 66. In FIG. 4, a detent lever 70 is shown which had to be rebuilt to add the perforation 72. The parking rod hole is at 74 and the manual shaft hole is shown at 76.

Figure 5:
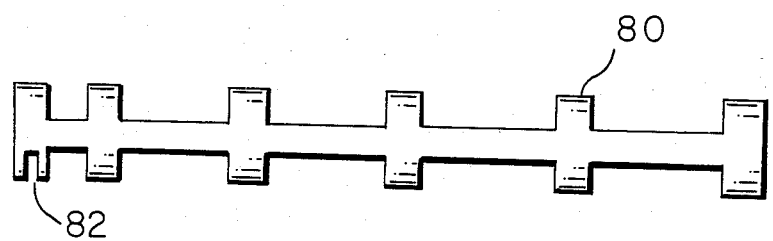
FIG. 5 shows an unmodified manual valve.
Figure 6:
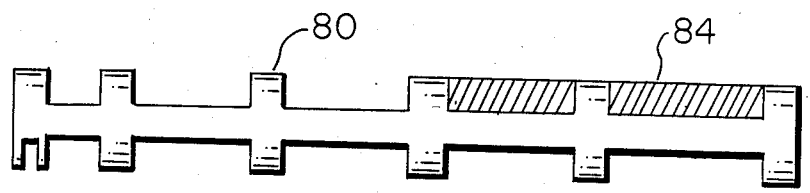
FIG. 6 shows a side view of a modified manual valve.
Figure 7:
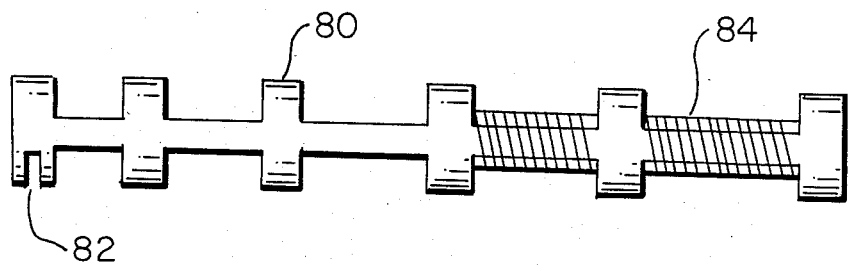
FIG. 7 shows a top view of a modified manual valve.
Figure 8:
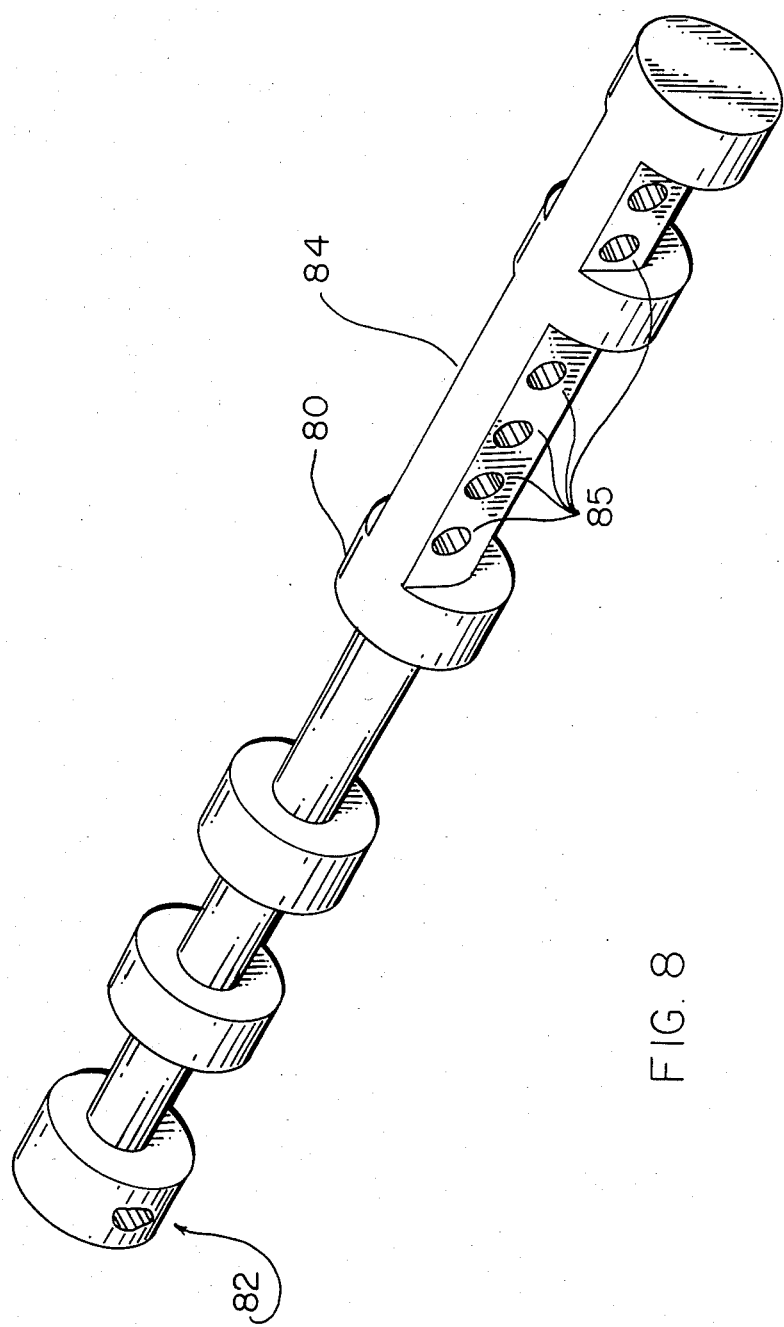
FIG. 8 shows a perspective view of a modified manual valve.
Figure 9:
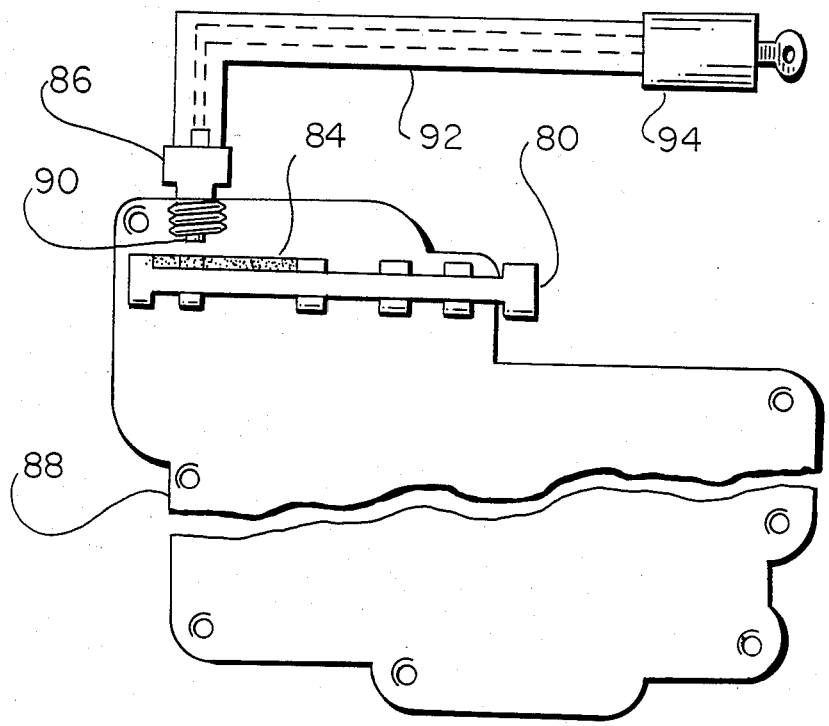
FIG. 9 shows the manual valve assembly in an unlatched position.
Figure 10:
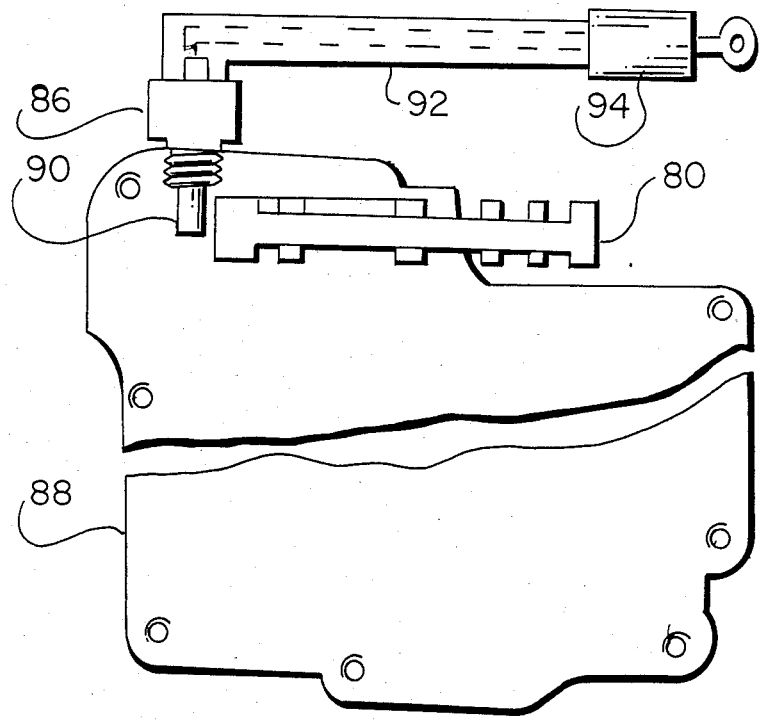
FIG. 10 shows the manual valve assembly in a latched position.

In a further embodiment the manual valve is modified to be locked. In FIG. 5, the unmodified manual valve 80 is shown. The detent lever connects with the manual valve at the point 82. The manual valve is modified as shown in FIGS. 6 and 7. In FIG. 6 a side view of the modification is shown. In FIG. 7 a top view of the modification is shown. The filling 84 modifies the manual valve to provide a smooth surface on which a bolt can slide. In FIG. 8, a perspective view of the manual valve 80 with the modification 83 is shown. Perforations 85 should be made through the manual valve 80 in order to permit oil circulation. In FIG. 9, the unlatching mechanism 86 is shown mounted through a hole in the manual valve body 88 in the position where a bolt 90 can slide on the modification 84. In the parking gear position shown in FIG. 10 the bolt 90 has been urged by a spring, as in the previous embodiments, into a position which blocks this manual valve. Again the unlatching mechanism can be mechanical, electromagnetic or vacuum. Again the linkage 92 to the key mechanism 94 must be armoured. Again, there must be a spring mechanism to urge the bolt 90 into the lock position if the linkage 92 is tampered with.

This invention is not limited to the preferred embodiments and alternatives heretofore described, to which variations and improvements may be made, consisting of mechanical and electrical modifications to component parts and procedures without leaving the scope of the present patent, the characteristics of which are summarized in the following claims.

What is claimed is:

1. An apparatus for latching an automatic transmission comprising:
    a latching subsystem including
    an outer manual lever, a portion of which is located in the automatic transmission, that portion having a first metal plate having a first smooth surface which is provided with a first blocking open end;
    a detent lever located within the automatic transmission having a second metal plate having a second smooth surface which is provided with a second blocking end; and
    a manual valve located within the automatic transmission having a third metal plate having a third smooth surface which is provided with a third blocking end;
    first, second and third bolts each bolt being associated with one of the metal plates of the outer manual lever, the detent lever and the manual valve, each of the bolts extends past the blocking open end of the associated metal plate when the automatic transmission is in a parking gear position;
    a spring urging the bolts into sliding contact with the smooth surfaces of the metal plates and past the blocking open ends thereby restricting movement of the manual lever, the detent lever, and the manual valve; locking means for
    locking each of the three spring biased bolts in a first locked position, and releasing the bolts in a second unlocked position, the locking means, in the second unlocked position, allowing the bolts to move against the spring bias, and armouring means over the locking means and the latching subsystem to prevent tampering.

2. An apparatus as in claim 1 where said unlatching means is a steel cable.

3. An apparatus as in claim 1 where said unlatching means is an electromechanical means.

4. An apparatus as in claim 1 where said unlatching means is a vacuum system.

* * * * *